Sept. 22, 1959  G. H. BARRY  2,905,837
DETECTOR SAMPLING MEANS
Filed July 26, 1957  6 Sheets-Sheet 1

INVENTOR.
GEORGE H. BARRY
BY Moody and Goldman
ATTORNEYS

Sept. 22, 1959

G. H. BARRY 2,905,837

DETECTOR SAMPLING MEANS

Filed July 26, 1957

INVENTOR.
GEORGE H. BARRY

BY Moody and Goldman

ATTORNEYS

FIG 7

United States Patent Office 2,905,837
Patented Sept. 22, 1959

2,905,837
DETECTOR SAMPLING MEANS

George H. Barry, North Hollywood, Calif., assignor to Collins Radio Company, Cedar Rapids, Iowa, a corporation of Iowa Application July 26, 1957, Serial No. 674,403

10 Claims. (Cl. 307—88.5)

This invention relates to a signal-converting system for a phase-pulse receiver.

This invention can be utilized with the detector of a phase-pulse system of the type described and claimed in patent application No. 502,045 titled "High Speed Transmission of Messages" by Melvin L. Doelz and Dean F. Babcock. Several other means are known for transmitting phase pulses, such as those described and claimed in Patent No. 2,676,245 titled "Polar Communication System" by Melvin L. Doelz; patent application No. 626,493 titled "Phase-Pulse Generator" by George H. Barry; application No. 634,559 titled "Locking-Oscillator Phase-Pulse Generator" by Dean F. Babcock, and now Patent 2,833,917, and application No. 633,143 titled "Matrix-Controlled Phase-Pulse Generator" by Dean F. Babcock, now Patent No. 2,870,430.

Briefly, the above-named type of phase-pulse system utilizes a predetermined phase change between adjacent tone pulses to recognize a mark or space of a binary code. Such system detects a mark or space by a phase comparison of two adjacent pulses, wherein each pulse acts as a phase reference for its immediately following pulse. Therefore, the system does not require any absolute phase reference and, hence, is not appreciably susceptible to unpredictable phase shifts caused by unpredictable delays in the propagation of a radio signal.

Furthermore, such system is particularly adaptable for the transmission of two independent channels of information on a single tone frequency. This is done by providing one of four phase conditions for each new tone pulse with respect to its prior tone pulse. The signal components of one channel are preferably in quadrature phase with the signal components of the other channel to enable detection by quadrature separation of tone components.

Figure 1:
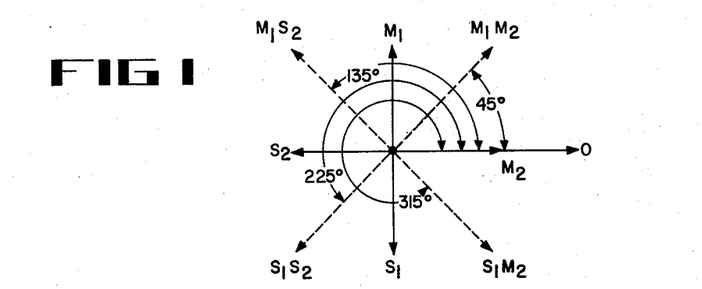
Figure 1, as mentioned above, illustrates a particular code for phase-pulse signals.

In a particular form of phase-pulse signal transmission presently used, the phase between any two adjacent pulses is either 45°, 135°, 225°, or 315°. Each one of these phase conditions contains two bits of information, corresponding to one bit for each of the two channels. Figure 1 illustrates a coding designation for dual-channel digital phase conditions between adjacent pulses. These code designations will be used throughout this specification, although they are arbitrary with respect to their mark-space designations. The phase of an adjacent prior pulse is always represented in Figure 1 by the reference vector 0 and the phase of the immediately following pulse is then represented by any one of the four dotted vectors $S_1M_2$, $S_1S_2$, $M_1S_2$, and $M_1M_2$; wherein S represents a space and M a mark of a binary code, with the subnumeral representing the channel of respective bit of information.

One type of detector for a phase-pulse receiver utilizes a pair of gated infinite-Q resonators, which select and integrate alternate of the phase-pulses being received on a single tone, that has the center frequency of each resonator. Thus, each resonator alternately receives a pulse and then is permitted to ring for the adjacent-following pulse period, wherein it rings with the same phase as the received pulse. The gated-resonators integrate their received tone pulses due to their extremely high Q, and due to the coincidence of the tone frequency and the resonator's tuned frequency.

A first phase detector has its input directly connected to the outputs of the resonators. The polarity of the first phase-detector output is dependent upon the information of one of the two binary channels being carried by the received tone. A second phase detector has one input connected directly to one of the resonator outputs but has its other input connected through a 90° phase-shift circuit to the other resonator output. The second phase-detector output is dependent polarity-wise on the second channel of binary information on the received tone.

The output of each phase detector in the phase-pulse detector is a voltage that varies polarity-wise according to its detected information. Due to the integration by the resonators, the outputs will vary in magnitude in a sawtooth fashion but will have polarities determined by the binary information. Furthermore, due to the integration of each detected phase-pulse, the signal-to-noise ratio at the output of the integrator is maximum at the end of each integration period. Also, it is then that maximum suppression of other tone frequencies is obtained, when plural tones are multiplexed together. It is only at the instant of maximum signal-to-noise ratio that a decision should be made as to the mark or space content of the detected pulse, since it is at this instant that the decision will have maximum accuracy. A decision before complete integration may be erroneous due to the fact that the signal may not then predominate over the noise or unwanted adjacent tone signals.

This invention provides means for sampling the phase-pulse detector outputs at their instances of maximum signal-to-noise ratio.

Furthermore, the invention is readily adaptable to diversity reception; wherein given tone information is being simultaneously obtained by a plurality of receivers, each having a separate phase-pulse detector. Simple signal-addition circuits can provide diversity combining of a given signal being simultaneously provided at the outputs of plural phase-pulse receivers. This invention permits diversity reception with a single sampling circuit per channel, regardless of the number of diversity receivers used when their outputs are combined as taught herein.

The invention thus can sample each channel output of a phase-pulse detector. Each channel of the invention includes a duel-polarity gate which receives a respective phase-pulse detector output. Short-duty-cycle sampling pulses, synchronized with the terminations of the received phase-pulses are provided to each dual-polarity gate. Each dual-polarity gate senses the polarity of its received phase-pulse detector output for the short instant of each sampling pulse, and provides an output during such instant with a polarity correlating to its received signal. A toggle circuit having a bistable output is provided with each dual-polarity gate and is controlled by its output. The polarity of the toggle-circuit output varies with the binary information of its channel; and it provides the channel information in square-wave form, which is generally the required form for teletypewriter operation.

In the phase-pulse detector described herein, the polarity of one of its two outputs is alternately reversed, which is a source of ambiguity. The invention provides a gating system that operates on this particular output to correct its polarity and eliminate the ambiguity. Thus, the output of the invention respectively provides binary information which can have the same form as a modulating signal at the transmitter. This form of signal is particularly useful for operating teletypewriter machines, although the signal can also be used for many other types of record-keeping operations, such as punching holes in a tape or card, or recording on magnetic tape, disc or drum, etc.

Further objects, features, and advantages of this invention will become apparent to a person skilled in the art upon further study of the specification and the accompanying drawings, in which.

Figure 3:
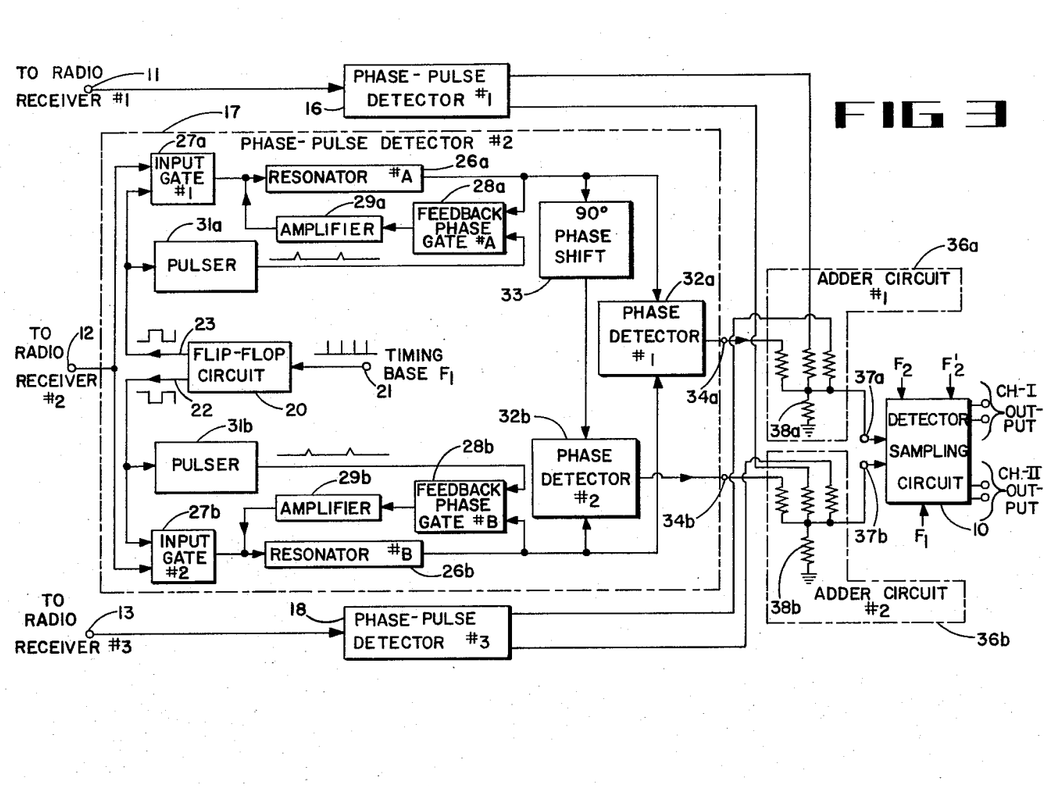
Figure 3 shows an arrangement of phase-pulse detectors and their connections to the invention for diversity reception.

Now referring to the drawings for a more detailed explanation of the invention and of its cooperative relationship in a phase-pulse receiving system, reference is made to Figure 3 which illustrates the cooperative relationship between a detector-sampling circuit 10 within a diversity receiving arrangement and three receivers (not shown) that simultaneously receive a tone signal having dual-channel phase-pulse information. The outputs of the three receivers are provided to the respective terminals 11, 12 and 13. First, second and third phase-pulse detectors 16, 17 and 18 have their inputs respectively connected to terminals 11, 12 and 13. Only phase-pulse detector 17 is shown in block detail; however, the other phase-pulse detectors 16 and 18 are each constructed identical to detector 17. The structure and operation of this type of phase-pulse detector was previously described and claimed in patent application No. 502,045 (cited above), and it will only briefly be discussed herein. It includes a flip-flop circuit 20 which has an input terminal 21 receiving time-base pulses $F_1$, that synchronize the detector operation with the received phase pulses. Pulses $F_1$ have a short-duty cycle and are synchronized with the trailing edges of the received phase-pulses. Flip-flop circuit 20 provides two bistable outputs 22 and 23 which teeter-totter with opposite phase.

Two resonators 26a and 26b have their inputs connected through "and" input gates 27a and 27b to the tone-signal input terminal 12. The other inputs to gates 27a and 27b are connected to the opposite outputs of flip-flop circuit 20. Therefore, gates 27a and 27b are alternately opened and closed by circuit 20 to permit alternate reception of phase-pulses by resonators 26a and 26b. Upon the opening of either gate 27a or 27b the incoming phase-pulse is received by the respective resonator 26a or 26b which is tuned to the same frequency as the incoming phase-pulse wave. Thus, the respective resonator linearly builds up in amplitude at the frequency and phase of the phase-pulse, after which the input gate is closed and the resonator is permitted to ring at the same frequency and phase.

Each of the two resonator circuits 26a and 26b can be keyed filters of the type described and claimed in patent application No. 501,524 to Melvin L. Doelz. Each keyed-resonator 26a and 26b has a feedback loop that normally provides positive feedback; but each feedback loop is synchronously gated to provide negative feedback for very short periods immediately before its input gate 27a or 27b is opened. The feedback loop is provided by a feedback-phase gate 28 and an amplifier 29. The gain of each amplifier 29 is adjusted so that the positive feedback has a level just below the point of causing oscillation, so that the resonator appears to have an infinite Q. Feedback gate 28 can be a balanced modulator of the type described in "Radio Engineering" by F. E. Terman, third edition, page 482; wherein the gate is normally biased to provide zero phase-shift, which is positive feedback. Feedback-phase gate 28 phase-shifts its output by 180 degrees during short pulses received from a pulser 31 to provide negative feedback for its resonator that very quickly quenches its oscillation. These quenching pulses are synchronized with the opening of its input gate 27 so that its resonator will be quiescent upon reception of a new phase-pulse and can be completely phase responsive to it. Each pulser 31 may be a one-shot multivibrator with a very short duty cycle, with its input connected to one of the outputs of flip-flop circuit 20.

Each keyed resonator circuit operates in the same manner, but operates upon different and alternate received phase-pulses. During the alternate period that a resonator is not receiving a phase-pulse, it continues to oscillate at the frequency and phase of its last received phase-pulse, thus "remembering" its phase.

Examples of outputs provided by keyed-resonators 26a and 26b are illustrated by Figures 2(B) and 2(C), respectively; wherein these figures represent the envelopes of the keyed resonator output waves. The phase of the waves within each envelope portion is represented by the vectors illustrated therein. Note the staggered relationship between the envelopes of Figures 2(B) and (C) caused by the alternate operation of input gates 27a and 27b. Figure 2(A) illustrates the synchronous occurrence of timing pulses $F_1$ relative to the output envelopes. The quenching pulses from each pulser 31 occur simultaneously with alternate timing pulses; that is, the quenching pulses have one-half the repetition rate of pulses $F_1$.

The phase of the waves included within the envelopes in Figures 2(B) and (C) is the phase of the phase-pulses respectively received by the keyed resonator. For simplicity, the illustrated phases assume a continuous transmission of $M_1M_2$ information; which, by the conventions adopted in Figure 1, requires each new phase-pulse to be advanced by 45° of phase with respect to its adjacent prior phase-pulse.

The keyed resonators integrate the phase-pulses and reject adjacent tone signals, but they do not separate the dual-channel information. The separation of the channels is done by a pair of phase detectors 32a and 32b shown in Figure 3. The inputs to phase detector 32a are respectively connected to the outputs of resonators 26a and 26a. However, phase detector 32b has one input connected directly to the output of resonator 26b, but has a 90° phase-shift circuit 33 connected between its other input and the output of resonator 26a. Phase detector 32a provides an output which is dependent upon the information of one of the dual channels on the received tone; while the output of phase detector 32b is dependent upon the information of the other channel.

Nevertheless, the channelized information provided at the outputs of phase detectors 32a and 32b is not in an advantageous form. One reason is that the phase of the resonator output increases in accuracy as the amplitude of each envelope increases, which is caused by the integration. Also, the signal-to-noise ratio increases as the envelope amplitude increases, because of signal integration. Due to the randomness of most noise, it integrates to substantially zero over the relatively long period of each phase-pulse. Thus, the output of each phase detector 32 is most reliable when both of its inputs are receiving peak-envelope values. Due to the staggered envelope relationship observed in Figures 2(B) and (C), it will be noted that both waves are at peak values for only very short intervals which occur at the instances of timing pulse $F_1$ shown in Figure 2(A).

This invention is primarily devoted to means for sampling the phase-detector outputs and forming an output wave therefrom which is usable by data recording devices. This is accomplished by detector sampling circuit 10 in Figure 3 which simultaneously receives the two channels of information provided by each phase-pulse detector. Accordingly, sampling circuit 10 has two sets of inputs and two sets of outputs to accommodate the two channels. In Figure 3, the common outputs of phase-pulse detectors 16, 17 and 18 are combined by the adder circuits 36a and 36b to provide diversity reception. In many cases, diversity reception is not required; and the two inputs 37a and 37b of detector sampling circuit 10 will then be connected directly to the outputs 34a and 34b of a single phase-pulse detector utilized in such case.

The diversity reception of a phase-pulse transmission is very simple compared to the diversity reception of some of the other types of modulation. Circuits such as 36a and 36b are simple resistor circuits for adding simultaneously the common outputs of the phase-pulse detectors. The output of such additive circuit automatically provides the best signal-to-noise ratio obtained by the diversity receivers. Thus, no system of sensing the receiver providing maximum signal-to-noise ratio is necessary; and no switching system for connecting such maximum receiver is necessary. Accordingly, each adder circuit 36 comprises an adding resistor 38 which has one end grounded and has its other end connected respectively to the same channel outputs of phase-pulse detectors 16, 17 and 18 through respective isolation resistors. The channel-I input to detector sampling circuit 10 is thus connected across adding resistor 38a; and its channel-II input is connected across resistor 38b.

Figure 2:
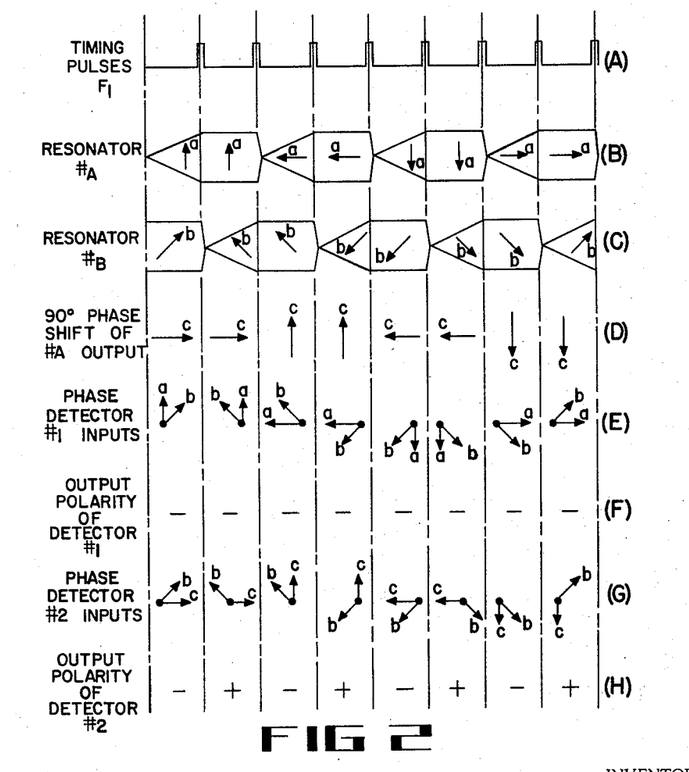
Figures 2(A) through (H) illustrate wave-forms and resulting vector relationships obtained by a phase-pulse detector with a continuous reception of $M_1M_2$ data information.

The input vector relationships to first and second phase detectors 32a and 32b are illustrated by Figures 2(E) and 2(F). The vectorial inputs to phase detector 32a, illustrated in Figure 2(E), are derived from the envelope phase illustrated in Figures 2(B) and 2(C). The conventions assumed herein assign a negative-polarity output from phase detector 32a to indicate a mark, while a positive polarity output indicates a space. As mentioned above, the waves in Figure 2 assume a continuous $M_1M_2$ tone transmission. Hence, Figure 2(F) shows a continuous negative-polarity output from phase detector 32a caused by its input phases to indicate the continuous reception of marks by channel I.

It is noted in Figure 3 that second phase detector 32b has its input from resonator 26a phase-shifted by 90°. This phase-shifted input is illustrated vectorially by Figure 2(D), while its other input is shown in Figure 2(B). The vector relationships at the inputs to second phase detector 32b, caused by the $M_1M_2$ tone transmission, are illustrated in Figure 2(G); and the corresponding output polarities from this phase detector are illustrated in Figure 2(H).

It is therefore noted from Figure 2(H) that the output polarity of second phase detector 32b alternately reverses when a continuous transmission of marks ($M_2$) is provided. This alternate reversal occurs from second phase detector 32b during any sequence of binary information for channel II. Accordingly, an ambiguity occurs in the polarity of phase-detected channel II information. Thus, if marks and spaces are assigned fixed polarities, some sort of polarity correction device is necessary to resolve the ambiguity at the output of second phase detector 32b. This invention also provides the necessary polarity correction.

Figure 4:
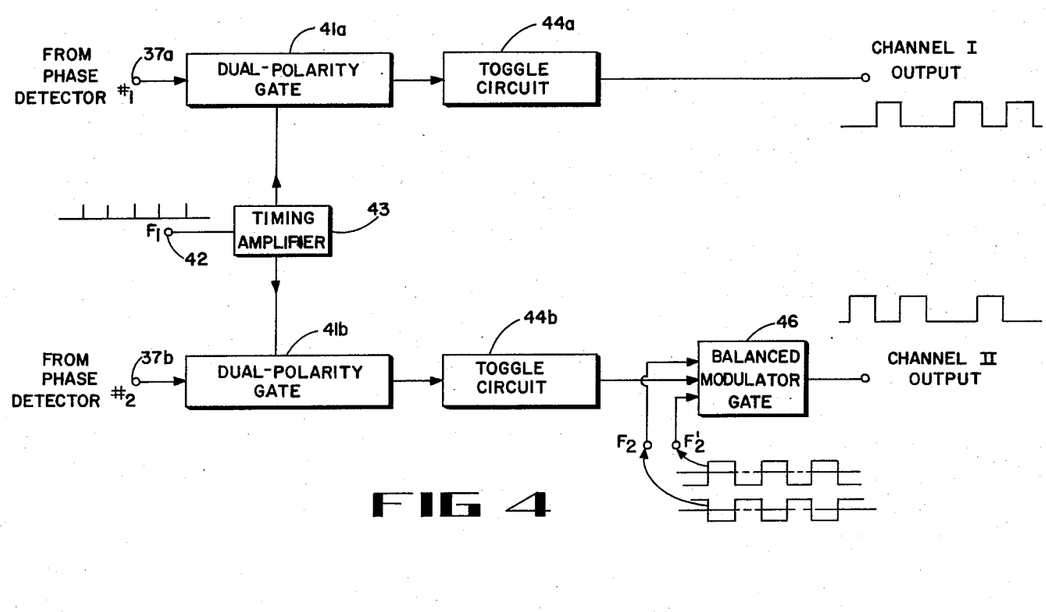
Figure 4 illustrates a block-diagram form of the invention.

A block-diagram form of the invention is illustrated in Figure 4. It includes a pair of dual-polarity gates 41a and 41b which respectively receive inputs from terminals 37a and 37b.

The dual-polarity gates are also controlled by timing pulses $F_1$ which are provided at terminal 42 in Figure 4 to the input of an amplifier 43, which has outputs connected to the control inputs of dual-polarity gates 41a and 41b.

Each dual-polarity gate provides an output pulse only during the short period of each timing pulse. And each output pulse from gate 41 has a direct-current polarity that corresponds to the polarity of the input to the dual-polarity gate at that instant. Each dual-polarity gate can be an electromechanical single-pole switch serially connected between the input and output terminals of each gate 41; wherein the switch is closed only for the duration of each timing pulse. However, due to the switching speeds involved, all electronic choppers are preferred.

Figure 7:
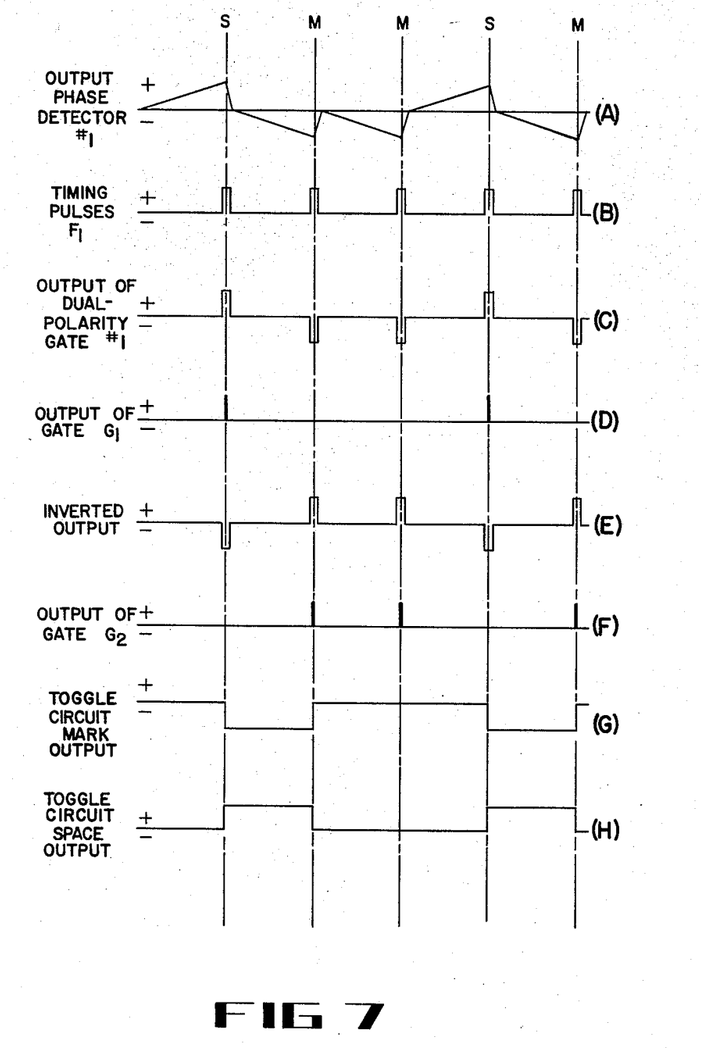
Figures 7(A) through (H) illustrate wave-forms used in explaining the operation of the invention.

An example of operation of either dual-polarity gate 41 is explained with the assistance of Figures 7(A), (B), and (C). Figure 7(A) shows an input to a dual-polarity gate provided by one of the outputs from a phase-pulse detector, such as the output from phase-detector #1. The polarity of these saw-tooth-like pulses contains the demodulated information for one channel. In practice, noise and other perturbations cause the pulses to deviate frome the saw-tooth-like form; and it is found that the most reliable information-bearing part of each pulse is the polarity of its terminating portions. Figure 7(B) illustrates the occurrence of timing pulses $F_1$, which are the same type of pulses shown in Figure 2(A). The corresponding output of the dual-polarity gate is illustrated in Figure 7(C). Thus, in Figure 7(C) the short duty-cycle output pulses provided by the output of the dual-polarity gate have a polarity corresponding to the polarity of the received output from the phase detector.

The outputs of both dual-polarity gates 41a and 41b will both be synchronously occurring short-duration pulses, but will be completely independent polarity-wise due to the fact that the binary-information content of the two channels need have no relationship.

A pair of toggle circuits 44a and 44b are respectively connected to the outputs of dual-polarity gates 41a and 41b. The toggle circuits are each a bistable circuit having two output levels; wherein one input-pulse polarity chooses one output level, and the other input-pulse polarity chooses the other output level. A conventional plate-coupled Eccles-Jordan circuit with an input connected to the control grid of one tube can provide this operation. Once a given flip-flop circuit output level is obtained, it remains until an opposite type of input pulse of proper amplitude is received, which causes the circuit output to reverse to its opposite level.

As explained above in connection with Figures 2(D) and 2(F), the polarity information provided at the output of first phase detector 32a correlates with the binary information of channel I. However, as also explained above in connection with Figures 2(G) and 2(H), the polarity at the output of second phase detector 32b is alternately reversed due to the 90° phase shift of one of its inputs. Polarity correction is provided in Figure 4 by a balanced-modulator gate 46, which has its input connected to the output of toggle circuit 44b. A pair of pulsed gating waves $F_2$ and $F_2'$ (inverted with respect to each other) are also provided as inputs to balanced-modulator gate 46. Waves $F_2$ and $F_2'$ are each square waves having one-half the repetition rate of the timing pulses, and having their leading edges synchronized with the timing pulses. Balanced-modulator gate 46 may be constructed in the same manner as a balanced modulator, such as taught in "Radio Engineering" by F. E. Terman, third edition, pages 481 and 482. For example, voltages $F_2$ and $F_2'$ can replace the opposite-phased modulating input voltages provided from the secondary of the input transformer as found on Terman's page 481. Hence, this input transformer is not needed. The output of toggle circuit 44b replaces the carrier input. Thus, the output of the balanced modulator is alternately reversed by waves $F_2$ and $F_2'$ in the same sequence that alternate polarity reversals occur at the output of second phase detector 32b. Hence, the output wave from balanced-modulator gate 46 is polarity correct and unambiguously provides the information of channel II.

Figure 5:
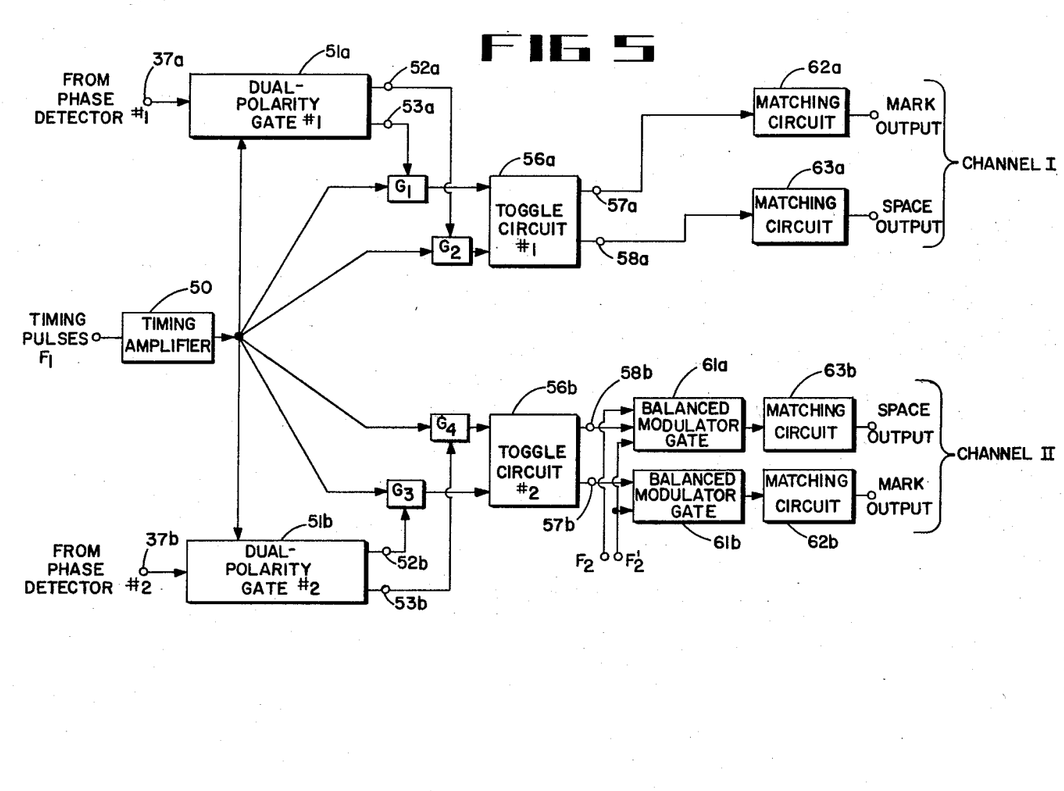
Figure 5 illustrates a modified block-diagram form of the invention.

In some cases, it is more expedient to use the output of each dual-polarity gate to indirectly control the respective toggle circuits rather than to provide the direct control shown in Figure 4. Figure 5 illustrates a form of the invention in which the toggle circuits are indirectly controlled by the dual-polarity gates by means of gates $G_1$ through $G_4$. Furthermore, the system of Figure 5 enables its toggle circuits to be actuated by input pulses having a single polarity, which is the polarity of the timing pulses, here assumed to be positive. In Figure 5, the timing pulses are directly used to trigger the toggle circuits, and the outputs of the dual-polarity gates control when the timing pulses are permitted to actuate the toggle circuits.

In Figure 5, each dual-polarity gate provides two polarity-inverted pulsed outputs, both synchronous with and having the same duty cycle as the timing pulses. Thus, the outputs provided at terminals 52a and 53a are pulses of opposite polarity, although the polarities of each output vary with the binary information of channel I. Figures 7(C) and 7(E) are illustrative of the outputs 52a and 53a. A similar situation occurs for outputs 52b and 53b from the other dual-polarity gate 51b.

The outputs from the dual-polarity gates in Figure 5 control the actuation of toggle circuits 56a and 56b. Outputs 52a and 53a are connected to the control inputs of gates $G_1$ and $G_2$; and similarly, the outputs 52b and 53b of dual-polarity gate 51b are connected to the control inputs of gates $G_3$ and $G_4$. The gates $G_1$ through $G_4$ are only sensitive to a single polarity of the dual-polarity gate output pulses, which herein is assumed for illustration purposes to be positive polarity pulses. Therefore, the gates $G_1$ through $G_4$ always reject negative pulses from their dual-polarity gates. Since gates $G_1$ through $G_4$ are generally asymmetric conducting devices, they are easily made sensitive only to a particular polarity of pulses received from their dual-polarity gate. Gates $G_1$ through $G_4$ are basically "and" circuits; and they have their other inputs receiving the timing pulses $F_1$. Since the timing pulses are continuous, each gate $G_1$ through $G_4$ provides an output pulse only when it receives a positive pulse from its dual-polarity gate.

Differentiating circuits are preferably provided with Gates $G_1$ through $G_4$ to sharpen their output pulses, since some trigger circuits operate best with sharp input pulses. Figure 7(D) illustrates the output of gate $G_1$; and Figure 7(G) illustrates the output of gate $G_2$ when their dual-polarity gate is receiving the information shown in Figure 7(A).

Each toggle circuit 56a or 56b is basically a trigger circuit, and can be the same type as described for toggle circuits 44 in Figure 4. Conventionally, trigger circuits of the Eccles-Jordan type have two inputs at the control grids of opposite tubes and can provide two inverted outputs at the plates of opposite tubes. Such circuits can also be used for toggle circuits 56a and 56b.

Separate inverted outputs from the toggle circuits are often preferred for some types of data systems used, which utilize separate inputs for mark and space information. Examples of outputs for toggle circuit 56a are illustrated in Figures 7(G) and 7(H) for the phase-detector output sequence given in Figure 7(A). Hence, Figure 7(G) illustrates the mark output, and Figure 7(H) illustrates the space output from the toggle circuit.

Due to the inverted relationship of the two pulsed outputs from each dual-polarity gate 51, non-inverted output 52 provides a positive pulse when a space is intended; and inverted output 53 provides a positive pulse when a mark is intended.

Hence, with channel I information, gate $G_1$ passes a triggering pulse when it receives a positive pulse from terminal 53a (signifying a mark) to trigger toggle circuit output 57a to its higher level and output 58a to its lower level. In a like manner, gate $G_2$ passes a triggering pulse when it receives a positive pulse from terminal 52a (signifying a space) to trigger toggle circuit output 58a to its higher level, and accordingly reversing output 57a to its lower level, since the two toggle-circuit outputs teeter-totter. Hence, only one of gate circuits $G_1$ or $G_2$ passes a triggering pulse at any one time, according to the binary information at the output of dual-polarity gate 51a.

Gates $G_3$ and $G_4$ operate in the same manner as $G_1$ and $G_2$, and therefore only one of them passes a trigger pulse at any one time to actuate toggle circuit 56b.

However, outputs 57b and 58b of toggle circuit 56b have polarity ambiguity as explained above with Figures 2(G) and 2(H) for the output of second phase detector 32b. To resolve the reversal ambiguity, a pair of balanced-modulator gates 61a and 61b respectively receive the mark and space outputs 57b and 58b of toggle circuit 56b. Furthermore, these balanced-modulator gates each receive the opposite-phased square-waves $F_2$ and $F_2'$ at their inputs, and each operates and is constructed in a like manner to balanced-modulator gate 46 in Figure 4. The balanced-modulator gates accordingly provide alternate reversals of the polarity of the second-channel signal to eliminate the polarity ambiguities at the output of the second channel of the detector sampling circuit.

Matching circuits 62a, 63a and 62b, 63b enable desired impedance levels to be obtained at the output of the detector sampling circuit for driving a utilizing device. For example, any of the matching circuits could be connected to a relay or power amplifier keyer for operating a teletypewriter machine. The matching circuits may be cathode-followers or emitter-followers. The toggle circuit outputs in the second channel are provided directly through matching circuits, since no polarity correction is necessary in channel I.

Figure 6:
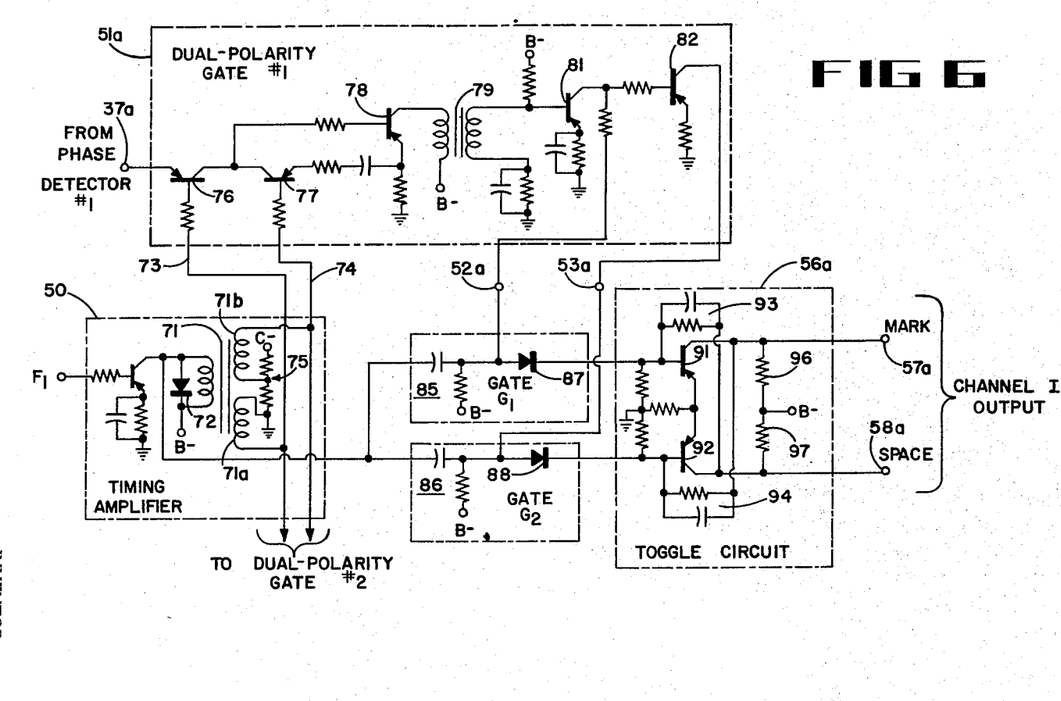
Figure 6 shows a detailed portion of the system of Figure 5.

Figure 6 illustrates detailed circuitry for dual-polarity gate 51a, timing amplifier 50, gates $G_1$ and $G_2$ and toggle circuit 56a illustrated in block form in Figure 5. Like portions of channel II can be constructed in the same manner. Although particular transistorized circuitry is shown, many alternative forms of circuitry will become apparent to a person in the art after studying this specification.

Timing amplifier 50 is a conventional common-emitter transistor amplifier, which has its input receiving timing pulses $F_1$. A coupling transformer 71 has opposite-phase secondary windings 71a and 71b to provide inverted timing pulse outputs to each dual-polarity gate. Secondary 71a has one end connected to ground; and secondary 71b has one end connected to a negative potential point on a voltage divider 75. A diode 72 is connected across the primary coil of transformer 71 to damp out undesired oscillation in the transformer circuit resulting from the timing pulses.

A pair of output leads 73 and 74 carry the opposite-polarity timing pulses to dual-polarity gate 51a. A pair of transistors 76 and 77 have their bases connected respectively through resistors to leads 73 and 74. The emitter of transistor 76 is connected to input terminal 37a to receive the channel I output from the phase-pulse detector. Another transistor 78 has its base connected through a resistor to the collectors of transistors 76 and 77. A resistor and a capacitor are serially connected between the emitters of transistors 77 and 78, and still another resistor is connected between ground and the emitter of transistor 78. The collector of transistor 78 is connected through the primary of a coupling transformer 79 to a B-minus power source. In their quiescent state, transistor 76 is biased nonconducting due to the ground connection of secondary 71a; and transistor 77 is biased into conduction because of the connection of secondary 71b to the negative potential provided by divider 75.

Thus, the bases of transistors 76 and 77 are oppositely driven in positive and negative directions by the timing pulses output of amplifier 50. If a positive potential exists at terminal 37a, transistor 76 will be made conducting during the period that it receives the positive timing pulse on its base, and its current output during this period will be provided to the base of transistor 78 to provide an amplified output pulse of positive polarity.

On the other hand, if a negative polarity phase-detector output exists at terminal 37a, transistor 76 will be maintained below cutoff; but the other transistor 77 conducts through its emitter circuit to actuate the emitter of transistor 78 and cause it to provide a negative-pulse output from transformer 79.

A conventional transistor amplifier 81 is coupled through a matching transformer 79 to the output of transistor 78 and provides output-current pulses to terminal 52a having a polarity that corresponds to the input polarity at terminal 37a.

Another common-emitter transistor amplifier 82 has its base coupled directly to the output of transistor 81 to provide a polarity inversion for pulses at the other output terminal 53a. Thus, dual-polarity gate 51a provides output at terminals 52a and 53a as shown in Figures 7(C) and 7(E).

Gates $G_1$ and $G_2$ have their inputs connected to the collector of the transistor in timing amplifier 50 to simultaneously receive the timing pulses. Each of gates $G_1$ and $G_2$ has an initial differentiating circuit 85 and 86 comprised of a capacitor and a resistor to sharpen the timing pulses. The diodes 87 and 88 within gates $G_1$ and $G_2$ provide asymmetric conductors for the gate circuits. The differentiating resistors are connected to B minus supplies to bias below cutoff the diodes 87 and 88 and also to provide the power-supply connection for transistors 81 and 82, respectively.

Diodes 87 and 88 in gates $G_1$ and $G_2$ are each driven into conduction only when receiving positive-voltage pulses from terminals 52a and 53a respectively. Thus, when a "mark" input is sampled, a positive differentiated timing pulse is provided at the output of gate $G_1$. On the othere hand, when a "space" input is sampled, a positive differentiated-timing pulse is provided at the output of gate $G_1$.

Toggle circuit 56a includes a pair of transistors 91 and 92 arranged to form a trigger circuit, with the bases of the transistors respectively connected to the outputs of gates $G_1$ and $G_2$. The bases and emitters of transistors 91 and 92 are connected to ground through respective resistors. A parallel R-C circuit 93 is connected between the base of transistor 91 and the collector of opposite transistor 92. Similarly, another parallel R-C circuit 94 is connected between the base of transistor 92 and the collector of its opposite transistor 91. A B-minus supply is connected through respective resistors 96 and 97 to the collectors of transistors 91 and 92.

Toggle circuit 56a is capable of providing either of two D.C. voltage levels at each of its output terminals 57a and 58a. Terminals 57a and 58a are always at opposite of these two levels. A positive pulsed output from gate $G_1$ to the base of transistor 91 in the toggle circuit causes or maintains "mark" output levels at terminals 57a and 58a as can be seen in Figures 7(G) and 7(H). In a similar manner, an output from gate $G_2$ to the base of transistor 92 causes or maintains an opposite set of outputs which are "space" outputs, which also can be viewed in Figures 7(G) and 7(H).

The polarity-reversal ambiguity can be corrected in other ways than by the balanced-modulator gates connected to the outputs of the toggle circuits 44b or 56b. For example, the ambiguity can be resolved by placing a gated phase-shifter at one input to second phase detector 32b and by alternately reversing its phase. However, it is generally more expedient to reverse the polarity of the detected output than to reverse the phase of the alternating current input.

The present invention can also be used to sample the output of frequency-shift keying detectors that integrate received frequency pulses. In such case, the frequency-shift keying detector is arranged to provide pulses of opposite polarity for mark and space inputs. The invention can then sample the output at its integration peaks and provide a well-shaped mark-space output controlled only by that portion of the integrated signal having maximum signal-to-noise ratio.

Although this invention has been described with respect to particular embodiments thereof, it is not to be so limited as changes and modifications may be made therein which are within the full intended scope of the invention as defined by the appended claims.

I claim:

1. Information-translating means for first and second periodically integrated outputs of a phase-pulse detector, comprising first and second dual-polarity gate means having their inputs respectively connected to the first and second periodically integrated outputs of said phase-pulse detector, a source of timing pulses, said timing pulses being synchronized with the termination of the integrations of the outputs from said phase-pulse detector, each of said dual-polarity gate means providing output pulses synchronous with said timing pulses and having polarity correlation with the polarity of the received phase-pulse detector integrated output, first and second dual-polarity trigger circuit means, each having its input connected to the output of one of said first and second dual-polarity gate means, whereby first and second channel data is provided by the outputs of said first and second dual-polarity trigger circuit means.

2. Information translating means as defined in claim 1, with said second phase-pulse detector outputs also having an alternate polarity ambiguity, including balanced-modulator gating means having its signal input connected to the output of said second dual-polarity trigger circuit means, a second source of pulses providing a pair of inverted pulses having one-half the repetition rate of said timing pulses and being synchronized with the output of said trigger circuit, and said balanced-modulator gating means having a pair of control inputs respectively connected to the inverted outputs of said second source.

3. Means for sampling and translating a periodically integrated signal, comprising dual-polarity gate means receiving said signal, a source of timing pulses synchronized with the terminal portions of said integrated signal, said dual-polarity gate means having at least one control input connected to said source of timing pulses, said dual-polarity gate means providing an output pulsed signal synchronous with said timing pulses and having a polarity correlating with the polarity of the synchronized portions of said periodically integrated signal, toggle-circuit means for bistably providing either of two output levels, timing-pulse gating means having at least one control input connected to said source of timing pulses, said timing-pulse gating means having at least one signal input connected to the output of said dual-polarity gate means, and the output of said timing-pulse gating means being connected in tandem with said toggle-circuit means.

4. Means for sampling and translating a periodically integrated signal having an alternate polarity ambiguity, including the means defined in claim 3, and having at least one balanced-modulator gating means with its signal input being connected to said toggle-circuit means, source means for providing a pair of pulsed signals having inverted polarity with respect to each other and being synchronous with the input to said balanced-modulator gating means, and said balanced-modulator gating means having opposite-phased control inputs respectively connected to the pair of pulsed signals of said source means.

5. Means for sampling first and second periodically integrated output signals having periodic terminal portions, comprising first and second dual-polarity gate means having signal inputs respectively receiving said integrated signals, a source of timing pulses synchronized with the terminal portions of said integrated signals, each dual-polarity gate means having a control input connected to said timing-pulse source, each dual-polarity gate means being closed by said timing pulses to pass a pulse to its output having a polarity correlating with the polarity of its received integrated signal, first and second toggle-circuit means for bistably providing either of two output levels, first timing-pulse gating means having a control input connected to said source of timing pulses, said first timing-pulse gating means having its signal input connected to the output of said first dual-polarity gate means, the output of said first timing-pulse gating-means being connected to the input of said first toggle-circuit means, second timing-pulse gating means having a control input connected to said timing-pulse source, said second timing-pulse gating means having its signal input connected to the output of said second dual-polarity gate means, the output of said second timing-pulse gating means being connected to the input of said second toggle-circuit means, balanced-modulator means having its input connected in tandem with the output of said second toggle-circuit means, means for providing a pair of inverted-pulsed signals having half the repetition rate of said timing pulses and being synchronized with the output of said second toggle circuit, said balanced-modulator means having a pair of control inputs connected respectively to the pair of signals of said inverted pulse means, whereby second channel data is provided by the output of said balanced-modulator means, and first channel data is provided by the output of said first toggle circuit.

6. Means for sampling the output of a phase-pulse detector providing first and second periodically integrated output signals having terminal integrated portions with maximum signal-to-noise ratio, comprising first and second dual-polarity gate means with their inputs respectively receiving the integrated outputs of said detector, a source of timing pulses synchronized with the signal terminal integrated portions, each dual-polarity gate means having a control input connected to said timing-pulse source, each dual-polarity gate means being gated closed by said timing pulses to provide a pair of pulsed outputs, with one output being inverted polarity-wise with respect to the other output of the pair, each of said dual-polarity gate means correlating the polarity of its outputs with the polarity of its received signal's terminal integrated portions, first and second toggle means, each providing opposite bistable output levels in response to respective opposite polarity inputs, first and second timing-pulse gates being respectively connected between the pair of outputs of said first dual-polarity gate means and the respective inputs to said first toggle means, said first and second timing-pulse gates having respective control inputs connected to said source of timing pulses and being closed therefrom, third and fourth timing-pulse gates being respectively connected between the pair of outputs of said second dual-polarity gate means and the inputs to said second toggle circuit, said third and fourth timing-pulse gates having respective control inputs connected to said source of timing pulses and being closed therefrom, and a source of a pair of inverted square-wave pulses being synchronized with the output of said second toggle means, balanced-modulator gates means having its signal input connected to the output of said second toggle circuit and having opposite-phased control inputs connected to said source of inverted pulses.

7. A system as defined by claim 6 which includes pulse inverting means connected to said source of timing pulses to provide a pair of inverted timing-pulse outputs, each of said dual-polarity gates comprising first, second and third transistors, each having at least a base, collector and emitter, said first transistor having its emitter connected to a respective output of said phase-pulse detector, means coupling the bases of said first and second transistors to the respective inverted timing-pulse outputs, means coupling the emitters of said second and third transistors, means coupling the base of said third transistor to the collectors of said first and second transistors, a transistor polarity-inverting amplifier, means connecting the input of said amplifier to the output of said third transistor, the input and output of said polarity-inverting amplifier providing the pair of inverted outputs of said respective dual-polarity gate means.

8. Detector sampling means for a phase-pulse detector providing a periodically integrated output with the terminal portions of the integrated periods having optimum signal-to-noise ratio, comprising a source of timing pulses synchronous with said terminal portions, a dual-polarity gate means, means coupling the input of said dual-polarity gate means to the output of said phase-pulse detector, said dual-polarity gate means having another input connected to said source of timing pulses, said dual-polarity gate means being triggered by said timing pulses to provide output pulses having polarities corresponding to the respective polarities of said terminal portions, dual-polarity flip-flop circuit means for providing bistable outputs, means coupling the output of said dual-polarity gate means to said flip-flop circuit means to switch it in timing and polarity with said dual-polarity gate means output pulses.

9. Detector-sampling means of the type defined in claim 8 but receiving a periodically integrated signal having alternate polarity reversal ambiguities, comprising pulse source means providing a pair of inverted square-wave pulses having one-half the repetition rate of said timing pulses and being synchronous with said timing pulses, balanced-modulator gate means having its opposite-phased inputs connected respectively to said inverted square-wave signals, the other signal input of said balanced-modulator gate means being connected to the output of said flip-flop circuit means.

10. Means for sampling a periodically integrated binary signal from a pulse-pulse detector, comprising a dual-polarity gate, having its input receiving said integrated signal from said phase-pulse detector, a source of timing pulses, wherein said timing pulses are synchronized with the terminations of the signal integrations, means connecting said timing pulse source to said dual-polarity gate means, said gate means providing a pulsed output synchronous with said timing pulses but having polarity correlation with the received integrated signal from said phase-pulse detector, dual-polarity trigger circuit means, and means coupling the input of said dual-polarity trigger circuit to the output of said dual-polarity gate means, a balanced modulator gate having its signal input connected to the output of said dual-polarity trigger circuit means, a second source of pulses providing a pair of inverted outputs having one-half the repetition rate of said timing pulses and being synchronized with said trigger circuit means, said balanced-modulator gate having a pair of control inputs connected to the inverted outputs of said second pulse source, whereby unambiguous channel information is provided by the output of said balanced-modulator gate.

References Cited in the file of this patent

UNITED STATES PATENTS

| 2,399,586 | Toomim | Apr. 30, 1946 |
|---|---|---|
| 2,512,152 | Haworth et al. | June 20, 1950 |
| 2,594,449 | Kircher | Apr. 29, 1952 |
| 2,724,780 | Harris | Nov. 22, 1955 |
| 2,729,809 | Hester | Jan. 3, 1956 |
| 2,787,712 | Priebe et al. | Apr. 2, 1957 |
| 2,802,954 | Graham et al. | Aug. 13, 1957 |